Aug. 14, 1923.
R. DE LOS SANTOS
1,464,588
COMPOSITION FOR THE MANUFACTURE OF BOXES, CASES, AND THE LIKE
Filed Jan. 29, 1921
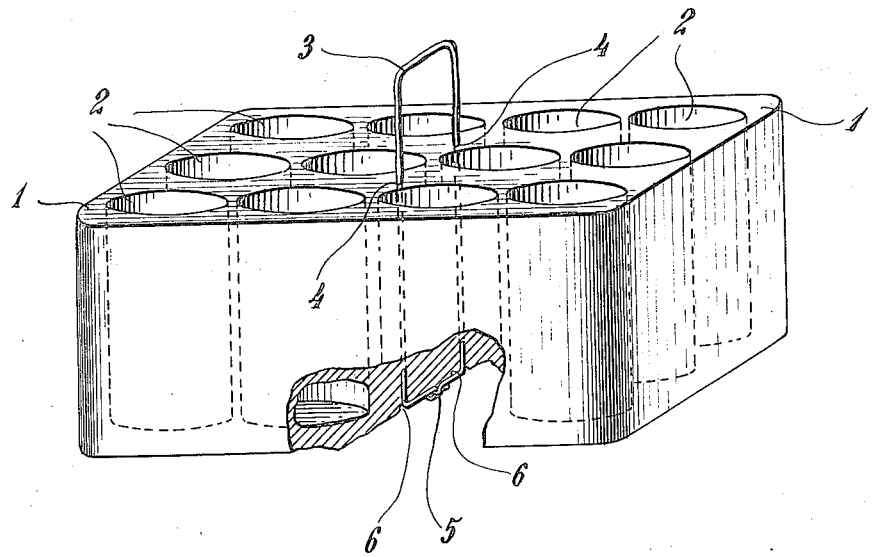
Raul de Los Santos Inventor
By his Attorney Patented Aug. 14, 1923.

1,464,588

UNITED STATES PATENT OFFICE.

RAUL DE LOS SANTOS, OF BUENOS AIRES, ARGENTINA.

COMPOSITION FOR THE MANUFACTURE OF BOXES, CASES, AND THE LIKE.

Application filed January 29, 1921. Serial No. 440,853.

*To all whom it may concern:*

Be it known that I, RAUL DE LOS SANTOS, citizen of the Republic of Argentina, residing at 151 Junin Street, Buenos Aires, Republic of Argentina, have invented certain new and useful Improvements in Composition for the Manufacture of Boxes, Cases, and the like, of which the following is a specification.

This invention relates to a novel composition for the manufacture of containers of any description, such as boxes or cases and substantially has for object a composition which after being suitably moulded or pressed, will furnish very cheap and durable containers, which will not be affected by any ordinary destructive influences and may be destined to any use which may be desired.

The composition in accordance with this invention, substantially consists of sawdust, straw of any suitable kind, to which is added, old sack-cloth made of hemp or jute fibre, or other cheap fiber, and calcined magnesite, chloride of magnesium and bichromated glue; of these ingredients suitable proportions are thoroughly mixed and the resulting paste is placed into moulds of convenient shape, according to the kind of container to be constructed, and is submitted within said mould to a suitable pressure, of about 110 tons, for instance.

In practice, the following proportions of ingredients have yielded very satisfactory results, viz:

|  | Per cent. |
|---|---|
| Sawdust | 60 |
| Straw, generally | 20–30 |
| Old sack-cloth or other cheap fiber | 5 |

To this mixture is added an amount varying from 5 to 25 per cent of the following materials: calcined magnesite, chloride of magnesium and bichromated glue.

The mixture, while in plastic conditions, is placed into a mould of suitable shape and is submitted therein to pressure, of a convenient degree, up to 110 tons and preferably applied by means of a hydraulic press.

The moulded object is thereupon taken out of the mould and left to dry, after which the same may be polished in case of necessity. If desired, a suitable pigment of colouring matter may be added to the composition.

By way of example, the accompanying drawing shows a perspective of a case adapted for transporting bottles, constructed of the above described composition. Said case consists of a block 1 formed with a series of cavities whose diameter corresponds to that of the bottles to be placed therein; the depth of the cavities 2 will be determined according to the requirements of use. In order to facilitate the handling of the case, two holes 4 may be formed in a vertical direction and a rope 3 is made to pass through said holes, being provided at its lower ends with a knot as at 5, for the reception of which are provided suitable recesses 6.

It will be evident that my invention is not restricted to any particular type of container nor to the proportions of ingredients above set forth, but changes may be introduced thereinto, within the scope of my invention.

I claim as my invention:

1. A plastic composition for the manufacture of containers consisting of a mixture of saw-dust, straw, cheap fibre, calcined magnesite, chloride of magnesium, and bichromated glue.

2. A plastic composition for the manufacture of containers, consisting of a mixture of saw-dust, straw, old sackcloth, calcined magnesite, chloride of magnesium, and bichromated glue.

In testimony whereof I have hereunto set my hand.

RAUL DE LOS SANTOS.